J. A. WHEELER.
METHOD OF FORMING FIREPROOF SLABS OR BOARDS.
APPLICATION FILED JAN. 5, 1912.
Reissued July 16, 1912. 13,446.
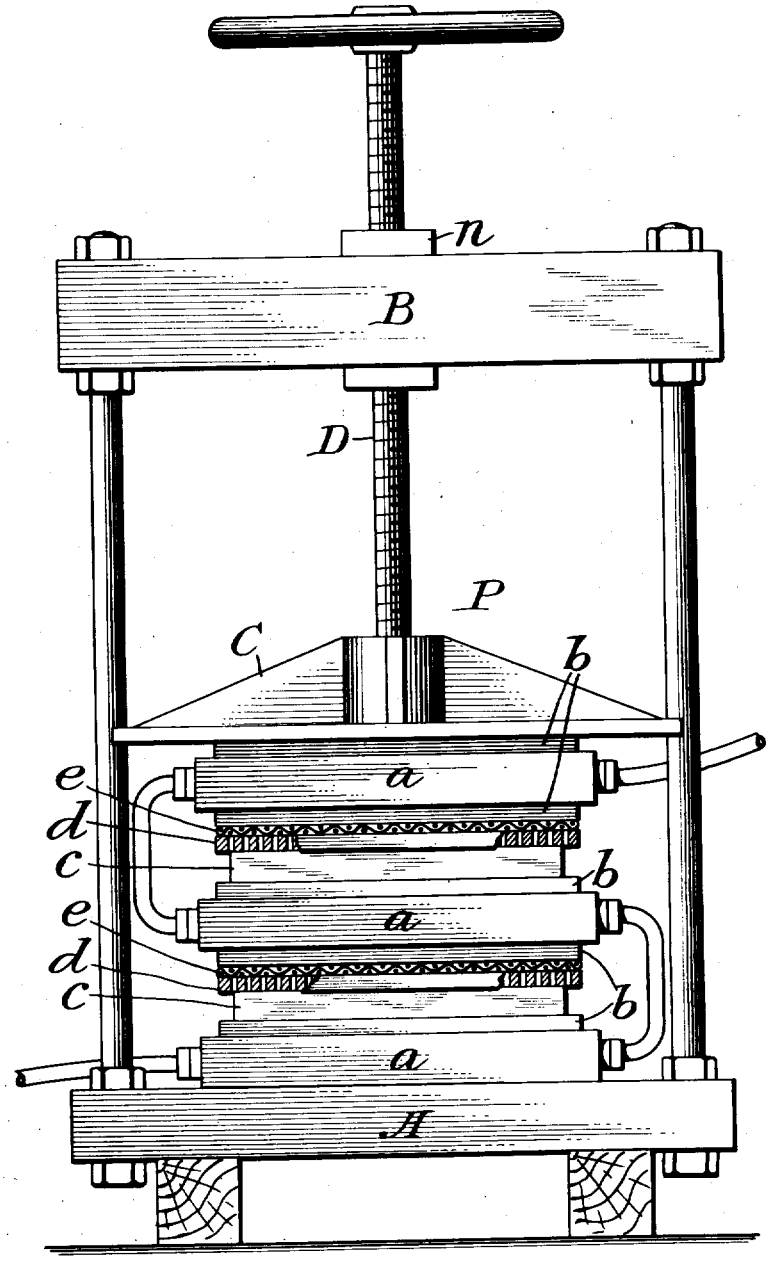
Witnesses:
A. R. Appleman
Bessie Cottingham
Inventor
James A. Wheeler,
By his Attorney
Joseph Reed Littell

UNITED STATES PATENT OFFICE.

JAMES A. WHEELER, OF SOMERSET COUNTY, NEW JERSEY, ASSIGNOR, BY MESNE ASSIGNMENTS, TO WILLIAM T. ELKINTON, OF PHILADELPHIA, PENNSYLVANIA.

METHOD OF FORMING FIREPROOF SLABS OR BOARDS.

13,446. Specification of Reissued Letters Patent. Reissued July 16, 1912.

Original No. 984,870, dated February 21, 1911, Serial No. 418,632. Application for reissue filed January 5, 1912. Serial No. 669,711.

*To all whom it may concern:*

Be it known that I, JAMES A. WHEELER, a citizen of the United States, and resident of the county of Somerset, in the State of New Jersey, have invented certain new and useful Improvements in Methods of Forming Fireproof Slabs or Boards, of which the following is a specification.

This invention relates to the class of building materials which are formed of artificially united substances solidified to resist the strain exerted on it by the structure to which it is applied.

The object of this invention is to provide an artificial lumber or building material which shall possess the aforesaid capacity in the highest degree and at the same time the capability of resisting fire or intense heat.

To that end the invention consists essentially of a solidified compound comprising a suitable filler constituting a basic element and including asbestos or an analogous substance incorporated therewith, and a relatively small proportion of a soluble fireproof binding material commingled with said materials and permanently uniting the same, as hereinafter more fully explained and set forth in the claims.

The filler or basic element of the improved artificial lumber or building material may be of any suitable or adapted substance, but it preferably includes burnt clay, and when burnt clay is employed I use either broken burned bricks, or the equivalent thereof consisting of lumps of ordinary clay burned in a suitable kiln to the hardness of burned bricks, and these burned lumps or broken bricks are crushed into small particles or into a pulverous condition by means of a suitable machine or apparatus.

In carrying out my invention, the filler element as above noted is mixed with a suitable amount of asbestos or analogous substance of fireproof quality, which is effectually incorporated therewith. I then add to said mixture a sufficient quantity of water and a suitable soluble fireproof binding material, preferably silicate of soda, in relatively small proportion and thoroughly stir the mass to convert it into a moist plastic substance of proper consistency to allow it to be molded or formed into any desired shape according to the use for which it is intended.

It will be understood that my invention is not restricted to the employment of any particular elements in the compound from which is produced the artificial lumber or building material, but that the improved method is adaptable to the forming of the slabs or articles from various compounds which consist of a suitable filler, preferably of fireproof quality, mixed with a relatively small proportion of a soluble fireproof binder and adapted to be solidified and hardened and dried to impart the desired density and strength for resisting the strains and condition of use in building construction. The specific form of the molded article may be varied to suit the circumstances and conditions of use, and I have herein shown the same in the form of a slab or board adapted for use in flooring, ceiling, or wainscoting construction or in other parts or features of general building constructions.

The molded article is hardened and dried to the desired degree of density, by placing it on a heated plate arranged in a suitable press by the operation of which the material of the article is compressed, and the accompanying drawings show a side view of a type of press adaptable in carrying out the improved method herein described and illustrate the arrangement of the molded articles therein.

In case the molded article is of the form of a slab or board, as hereinbefore set forth, I preferably place in the press a tier of such molded articles, as shown in the accompanying drawings, in which—

P denotes the press, which may be of any suitable shape and construction.

*a—a* represent a plurality of hollow plates or chambers, which are heated by steam admitted to the interiors thereof, the steam being introduced by suitable communicating tubes or pipes. In placing the molded articles in the press, the first chamber or plate *a* is disposed on the bed or base, A, of the press, then a smooth metal plate or sheet, *b*, is placed upon the said plate *a*, and upon the sheet *b* is placed the molded article, *c*. Then a perforated metal plate or sheet, *d*, is placed upon the molded article *c*, the perforations of said sheet being preferably formed with upwardly-projecting edges or burs, to allow the moisture or steam to escape from the molded article. Upon the sheet *d* is laid a sheet of wire netting, *e*, to permit the escaping moisture or steam to pass out laterally from the top of the sheet *d*. Upon this wire netting is placed another smooth metal plate or sheet, *b*, and upon this is placed the second heated chamber or plate, *a*. In this manner, the molded articles, with intervening heated steam chambers or plates and with the imperforate and perforated plates or sheets and wire netting, as above described, are successively disposed in a tier in the press, and then, by operating said press so as to cause its follower, C, to press onto the top of the tier, the entire tier of molded articles is subjected to the required pressure and heat to effectually harden and dry said articles.

In a press of the type here illustrated, the pressure is obtained by the operation of the screw, D, working in a nut, *n*, attached to the head, B, of the press.

It will be understood that the smooth metal plate or sheet *b* is placed in intervening position between the molded article and the heated chamber or plate *a*, to enable the convenient removal of the molded article from said heated chamber or plate, after it has been hardened and dried in the desired degree, and to prevent adhesion of the molded article to said chamber or plate. In practice, the employment of the plate or sheet *b* enables the removal of both said plate and the molded article from position upon the heated chamber or plate, and the convenient subsequent separation of the plate *b* and the molded article.

What I claim as my invention is:

1. The method of forming artificial lumber, which consists in combining a suitable filler with a relatively small proportion of a soluble fireproof binder to produce a plastic substance, then molding the moist plastic substance into the desired shape, then placing the molded articles in a suitable press in association with heated chambers or plates with a metal plate or sheet intervening between said molded article and the heated chamber or plate, and then subjecting said elements within the press to the requisite pressure and heat to dry and compress and harden the molded articles to the desired degree of density.

2. The method of forming artificial lumber, which consists in combining a suitable filler with a relatively small proportion of a soluble fireproof binder to produce a plastic substance, then molding the moist plastic substance into the desired shape, then placing the molded articles in a suitable press in association with heated chambers or plates with a perforated metal plate or sheet placed against the surface of the molded article, and then subjecting said elements within the press to the requisite pressure and heat to dry and compress and harden the molded articles to the desired degree of density.

3. The method of forming artificial lumber, which consists in combining a suitable filler with a relatively small proportion of a soluble fireproof binder to produce a plastic substance, then molding the moist plastic substance into the desired shape, then placing the molded articles in a suitable press in association with heated chambers or plates with a metal plate or sheet intervening between said molded article and the heated chamber or plate and with a perforated metal plate or sheet placed against the surface of the molded article, and then subjecting said elements within the press to the requisite pressure and heat to dry and compress and harden the molded articles to the desired degree of density.

4. The method of forming artificial lumber, which consists in combining a suitable filler with a relatively small proportion of a soluble fireproof binder to produce a plastic substance, then molding the moist plastic substance into the desired shape, then placing the molded articles in a suitable press in association with heated chambers or plates with a perforated metal plate or sheet placed against the surface of the molded article and with a sheet of wire netting placed against said perforated plate, and then subjecting said elements within the press to the requisite pressure and heat to dry and compress and harden the molded articles to the desired degree of density.

5. The method of forming artificial lumber, which consists in combining a suitable filler with a relatively small proportion of a soluble fireproof binder to produce a plastic substance, then molding the moist plastic substance into the desired shape, then placing the molded articles in a suitable press in association with heated chambers or plates with a metal plate or sheet intervening between said molded article and the heated chamber or plate and with a perforated metal plate or sheet placed against the surface of the molded article and with a sheet of wire netting placed against said perforated plate, and then subjecting said elements within the press to the requisite pressure and heat to dry and compress and harden the molded articles to the desired degree of density.

6. The method of forming artificial lumber, which consists in combining a suitable filler with a relatively small proportion of a soluble fireproof binder to produce a plastic substance, then molding the moist plastic substance into the desired shape, then placing the molded articles in a tier in a suitable press in association with intervening heated chambers or plates with metal plates or sheets intervening between said molded articles and the heated chambers or plates and with perforated metal plates or sheets placed against the surface of the molded articles, and then subjecting said elements within the press to the requisite pressure and heat to dry and compress and harden the molded articles to the desired degree of density.

7. The method of forming artificial lumber, which consists in combining a suitable filler with a relatively small proportion of a soluble fireproof binder to produce a plastic substance, then molding the moist plastic substance into the desired shape, then placing the molded articles in a tier in a suitable press in association with intervening heated chambers or plates with metal plates or sheets intervening between said molded articles and the heated chambers or plates and with perforated metal plates or sheets placed against the surface of the molded articles and sheets of wire netting placed against said perforated plates, and then subjecting the tier to the requisite pressure and heat to dry and compress and harden the molded articles to the desired degree of density.

8. The method of forming artificial lumber, which consists in combining a suitable filler including asbestos with a relatively small proportion of a soluble fireproof binder and a fluid to produce a plastic substance, then molding the moist plastic substance into the desired shape, then placing the molded articles in a suitable press in association with heated chambers or plates with intervening imperforate and perforate metal plates or sheets, and then subjecting said elements within the press to the requisite pressure and heat to dry and compress and harden the molded articles to the desired degree of density.

9. The method of forming artificial lumber, such as fireproof slabs or boards, which consists in burning clay to the requisite hardness and then crushing the same to a pulverous condition, then mixing with said material a suitable amount of asbestos, then adding to the mixture a relatively small proportion of silicate of soda to form a soluble fireproof binder, and also water, to produce a plastic substance, then molding the moist plastic substance into the desired shape, then placing the molded articles in a suitable press in association with heated chambers or plates with a metal plate or sheet intervening between said molded article and the heated chamber or plate and with a perforated metal plate or sheet placed against the surface of the molded article and a sheet of wire netting placed against said perforated plate, and then subjecting said elements within the press to the requisite pressure and heat to dry and compress and harden the molded articles to the desired degree of density.

10. The method of forming artificial lumber, such as fireproof slabs or boards, which consists in burning clay to the requisite hardness and crushing the same to a pulverous condition, then mixing with said material a suitable amount of asbestos, then adding to the mixture a relatively small proportion of silicate of soda to form a soluble fireproof binder, and also water, to produce a plastic substance, then molding the moist plastic substance into the desired shape, and finally placing the molded articles in a tier in a suitable press with intervening heated plates and sheets of wire netting, and subjecting the tier to the requisite pressure and heat to effectually harden and dry the said articles.

In testimony whereof I have signed my name in the presence of the subscribing witnesses.

JAMES A. WHEELER.

Witnesses:
BESSIE COSTIGAN,
FRANCES P. ROSENLICHT.